United States Patent [19]

Parker

[11] 4,339,370
[45] Jul. 13, 1982

[54] HIGHLY FILLED CROSSLINKABLE EMULSION POLYMER COMPOSITION

[75] Inventor: Robert G. Parker, Irchester, England

[73] Assignee: Scott Bader Company Limited, Northamptonshire, England

[21] Appl. No.: 237,924

[22] Filed: Feb. 25, 1981

[30] Foreign Application Priority Data

Mar. 3, 1980 [GB] United Kingdom ............... 8007091

[51] Int. Cl.$^3$ .............................................. C08L 3/26
[52] U.S. Cl. .................................. 524/424; 525/166; 525/177
[58] Field of Search .................................. 260/29.6 M

[56] References Cited

U.S. PATENT DOCUMENTS 2,904,526 9/1959 Uelzmann .................... 260/29.6 M

FOREIGN PATENT DOCUMENTS 1254294 11/1968 United Kingdom .
1254461 11/1968 United Kingdom .

Primary Examiner—Joseph L. Schofer
Assistant Examiner—N. Sarofim
Attorney, Agent, or Firm—Pearne, Gordon, Sessions, McCoy & Granger

[57] ABSTRACT

Highly filled crosslinkable emulsion polymer compositions containing vinyl aromatic monomers and acrylate or methacrylate monomers can be provided with improved retention of adhesive power in the face of attack by water and improved shelf-life by the presence of zinc ammonium carbonate in the composition. The zinc ammonium carbonate is preferably in the form of an aqueous solution prepared by reacting an equimolar amount of ammonium carbonate and ammonium hydrogen carbonate with zinc oxide and ammonia.

9 Claims, No Drawings

HIGHLY FILLED CROSSLINKABLE EMULSION POLYMER COMPOSITION

FIELD OF THE INVENTION

This invention relates to highly filled crosslinkable emulsion polymer compositions.

BACKGROUND OF THE INVENTION

There are many possible applications where highly filled water based systems would be cheaper and safer to use than materials currently used in such applications, but their employment has been limited by their lack of retention of adhesive power when subject to attack by moisture.

Such applications include ceramic tile adhesives, wood fillers, metal fillers, grouts, external coatings, paints, wallpaper, clay coating etc. In most of these applications the ratio of filler to polymer is very high, of the order of 10:1, and attempts to improve the poor adhesion retention of such compositions when applied to substrates subject to attack by moisture have not been particularly successful. In addition, some have a poor shelf-life and tend to gel up on storage after about 1 month.

The use of zinc to reduce water-sensitivity in unfilled emulsions such as those used in floor polishes is known (U.K Specification No. 1254294). The zinc is introduced into the composition as a water-soluble complex or chelate, for example, zinc carbonate solubilized in ammonium hydroxide. The compositions are formulated so as to be soluble in alkali, and are said to display satisfactory gloss, water resistance, recoatability and removability and it is suggested that the presence of the metal ion renders the coating insoluble in water.

SUMMARY OF THE INVENTION

Surprisingly we find that the presence of zinc in a highly filled emulsion copolymer composition suitable for use as an adhesive, filling material or coating gives, when applied, a vastly improved retention of adhesive power after attack by water and, before application, a very large increase in shelf-life.

The adhesive power of such a composition applied to a substrate which is then immersed in water is several magnitudes greater than for an adhesive composition not containing zinc. It is believed (though the present invention is not based on this theory) that this is due to some interaction occurring between the filler, resin and zinc components.

The stability of a composition of the invention as compared with that of a conventional composition is superior, the shelf-life of a composition of the invention being from 6 to 24 months as opposed to about 1 month for a conventional composition.

Zinc is preferably present in the composition in an amount of 0.5 to 5%, more preferably 0.75 to 2% by weight.

The compositions of the invention are highly filled copolymer emulsions of vinyl aromatic monomers, acrylate or methacrylate monomers and a minor percentage of (meth) acrylic acid or higher homologue modified by the presence of zinc ammonium carbonate or zinc ammonium hydrogen carbonate or both (such compounds being referred to hereinafter as "zinc ammonium carbonate compounds") to permit the formulation of highly filled compositions providing excellent resistance to moisture and good adhesion.

The vinyl aromatic monomer in a composition of the invention may, for example, be styrene, vinyl toluene, chlorostyrene or t-butyl styrene and is preferably styrene.

The acrylate or methacrylate monomer may, for example, be methyl, ethyl, propyl, butyl, 2-ethyl hexyl and heptyl acrylate or methacrylate.

Other unsaturated monomers may be additionally present such as acrylonitrile.

By "highly filled" we mean compositions usually having about 50% to 96% by weight of inorganic filler, more usually above 70%.

The unsaturated organic acid may be acrylic, methacrylic or a higher homologue, and preferably it is used in an amount of more than 1% (and preferably up to 10%) by weight based on the copolymer.

The ammonium carbonate may take the form of the usual equimolar mixture of ammonium hydrogen carbonate and ammonium carbonate, or other material which functions as ammonium carbonate.

The zinc ammonium carbonate compound can be incorporated as a solution containing 10% by weight of zinc and this can be present in the emulsion at levels between 7.5 and 20 parts per hundred by weight based on wet emulsion.

It is probable that the zinc ammonium carbonate compound acts as a source of ionic crosslinking when the water and ammonia evaporate from the composition, thus reducing its water sensitivity. It also greatly improves the adhesion of the filled composition to a variety of substrates such as mild steel, brick, asbestos cement etc.

A suitable zinc ammonium carbonate solution can be made by dissolving zinc oxide in a mixture of ammonium carbonate and ammonia (of specific gravity 0.880) and adjusting the zinc concentration to the desired range with water.

DETAILED DESCRIPTION OF PREFERRED EMBODIMENTS

The preparation of an aqueous solution of a zinc ammonium carbonate compound and preferred compositions modified thereby will now be described with reference to the following Examples, which include an example of a known composition (Example 3) for comparison.

Preparation of Zinc Ammonium Carbonate

Dissolve 14 g ammonium carbonate (actually an equimolar mixture of ammonium hydrogen carbonate and ammonium carbonate) in 56 g de-mineralised water. Disperse 14 g zinc oxide in the solution and add 15 g ammonia (0.880) with stirring. Continue stirring until a clear solution is obtained and add sufficient demineralised water to obtain a Zn content of 10%.

EXAMPLE 1

A ceramic tile adhesive was made by mixing the following components:

| | |
|---|---|
| Anionic 50% solids copolymer emulsion based styrene 40%, 2 ethyl hexyl acrylate 45% acrylonitrile 10% and acrylic acid 5% | 144.0 pbw |
| Zinc ammonium carbonate 10% solution | 21.5 pbw |
| Foamaster ® 44 - antifoam | 1.0 pbw |
| Butyl Diglycol acetate - coalescing solvent | 7.5 pbw |

| | |
|---|---|
| Natrosol ® 250HR - thickener | 1.5 pbw |
| Water | 78.0 pbw |
| Proxel ® XL2 - preservative | 1.5 pbw |
| Calmote ® B95 - limestone filler | 745.0 pbw |

When tested to B.S.5385 Part 1: 1976: Section A5.8 adhered tiles had a shear strength after 7 days water immersion of 1.0–1.75 MPa. Moreover when tiles were stuck biscuit to glaze with the above composition and immersed in water the shear strength was still above the 0.4 MPa minimum requirements.

EXAMPLE 2

When a styrene/acrylate copolymer emulsion containing only 1% acrylic acid was used to make a ceramic tile adhesive as described in Example 1 the shear strength of the bond when tested after water immersion was below 0.3 MPa.

EXAMPLE 3

When a ceramic tile adhesive was made as in Example 1 excluding the "zinc ammonium carbonate" the shear strength when tested after water immersion was zero.

EXAMPLE 4

A ceramic tile adhesive was made by mixing the following compositions:

| | |
|---|---|
| Emulsion of example 1 | 144.0 pbw |
| Zinc ammonium carbonate 10% solution | 21.5 pbw |
| Foamaster ® 44 - antifoam | 1.0 pbw |
| Natrosol ® 250HR - thickener | 3.0 pbw |
| Densil ® P - preservative | 2.0 pbw |
| Dibutyl phthalate | 2.0 pbw |
| Calgon ® 20% solution - dispersant | 1.0 pbw |
| Dispex ® G.40 - dispersant | 1.5 pbw |
| Water | 167.0 pbw |
| Silica XPF3 - filler | 375.0 pbw |
| Silica XPF2 - filler | 375.0 pbw |

The shelf-life of this adhesive is from 6–12 months. When tested as in Example 1 its shear strength was 0.9 MPa.

I claim:

1. An aqueous emulsion copolymer coating composition which contains (a) above about 70% by weight of the total weight of the composition of at least one inorganic filler component and (b) an aqueous emulsion of a copolymer containing at least one vinyl aromatic monomer, at least one acrylate monomer selected from acrylates and methacrylates and from one to 10% of an unsaturated organic acid, the composition being modified by the presence of (c) a zinc ammonium carbonate compound to give the composition improved retention of adhesive power in the face of attack by water and increased shelf-life.

2. An emulsion copolymer composition according to claim 1, wherein the zinc ammonium carbonate compound is present in an aqueous solution.

3. An emulsion copolymer composition according to claim 2, wherein the solution is the product of an equimolar mixture of ammonium carbonate and ammonium hydrogen carbonate reacted with zinc oxide and ammonia.

4. An emulsion copolymer composition according to claim 2 or claim 3, wherein the zinc is added to the composition in the form of a solution containing 10% by weight of zinc.

5. An emulsion copolymer composition according to claim 1, wherein the vinyl aromatic monomer is selected from the group consisting of styrene, vinyl toluene, chlorostyrene and t-butyl styrene.

6. An emulsion copolymer composition according to claim 1, wherein the acrylate monomer is selected from the group consisting of methyl, ethyl, propyl, butyl, 2-ethyl hexyl and heptyl acrylates and methacrylates.

7. An emulsion copolymer composition according to claim 1, which additionally includes at least one further unsaturated monomer.

8. An emulsion copolymer composition according to claim 7, wherein the said at least one further unsaturated monomer is present, in an amount by weight of the total amount of monomers, of up to 10%.

9. In a highly filled aqueous emulsion copolymer composition comprising an aqueous emulsion of a copolymer containing at least one vinyl aromatic monomer, at least one acrylate monomer selected from acrylates and methacrylates, and an unsaturated organic acid, and above about 70% by weight of the total weight of the composition of at least one inorganic filler, the improvement comprising the presence of zinc ammonium carbonate to improve retention of adhesive power of the emulsion composition in the face of attack by water and to increase shelf-life.

* * * * *